Feb. 10, 1953    R. L. GILLILAND    2,628,139
SEALED PRESSURE RESPONSIVE MECHANISM
Filed Aug. 29, 1950
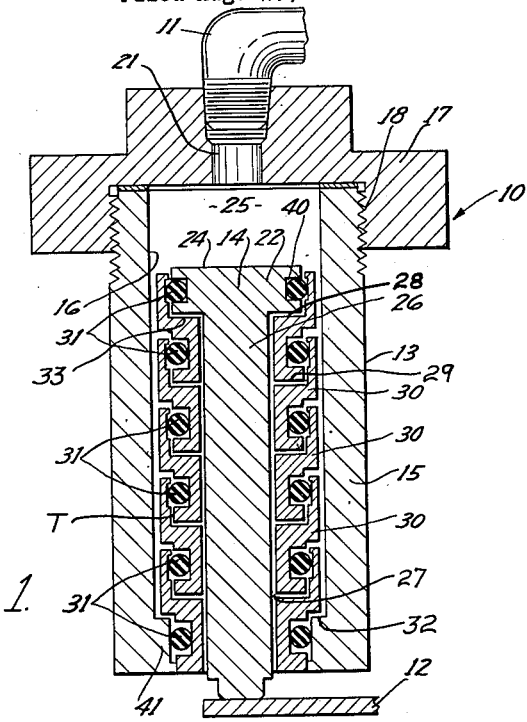
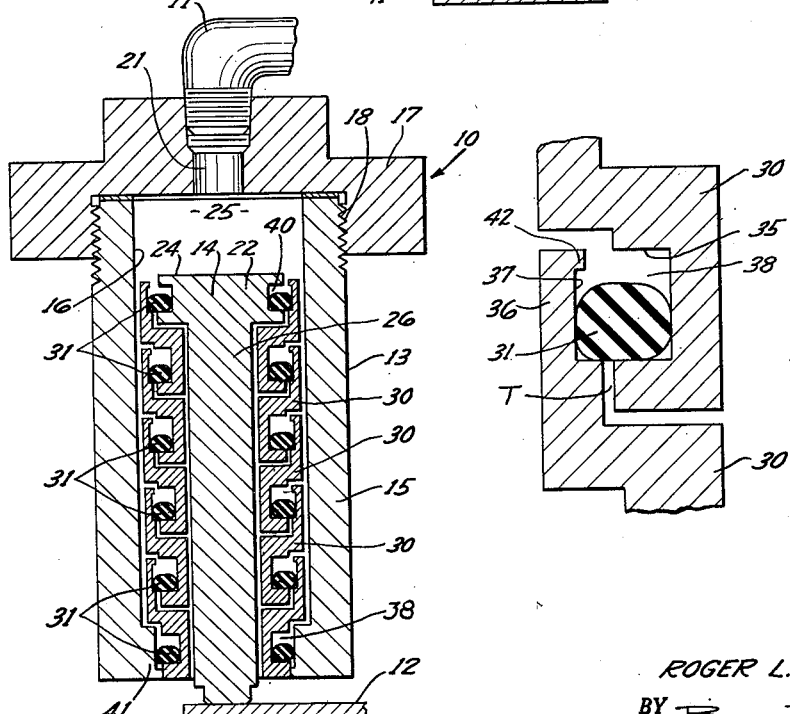
INVENTOR.
ROGER L. GILLILAND
BY
ATTORNEYS.

Patented Feb. 10, 1953

2,628,139

UNITED STATES PATENT OFFICE 2,628,139

SEALED PRESSURE RESPONSIVE MECHANISM

Roger L. Gilliland, Euclid, Ohio, assignor to The Swartwout Company, Cleveland, Ohio, a corporation of Ohio Application August 29, 1950, Serial No. 182,024

11 Claims. (Cl. 309—1)

This invention relates to high pressure fluid seals and more particularly to such seals which will maintain a fluid tight seal between movable parts and facilitate sensitive movement therebetween in response to small changes in pressure.

In steam power plant operation it is often desired to control various instrumentalities in response or regard to changes in high steam or other high pressures. Steam and feedwater pressures often range to levels as high as 1,500 to 2,000 pounds per square inch and in providing a device that is capable of measuring such pressures and actuating feedwater, combustion or other controls in response to such pressures and the changes therein the problem often resolves to one of obtaining a significant mechanical movement in response to small changes in such high pressures without leakage or loss of high pressure fluid and with desirable sensitivity throughout a long life. In many pressure operated control systems the pressure to be controlled or the pressure to be taken as a measure of a condition to be controlled actuates a pressure responsive device which translates the value of that pressure or the changes in pressure into forces which are exerted on a movable member and which in turn operates the pilot control valve of conventional control apparatus. Under conditions when the pressures are, for example, about 1,000 pounds or more, it has been impracticable heretofore to maintain an effective seal against the high pressures and at the same time obtain the desired operating motion and sensitivity from a measuring and control device.

My invention contemplates a pressure responsive device of a piston and cylinder type which is adapted to respond by piston motion to small changes in pressure of a fluid at high pressure levels of, for example, 1,500–2,000 pounds per square inch obtaining motion of the piston accurately representative of small changes in the pressure and at the same time providing an effective fluid seal at such pressures. In principle, my fluid pressure device provides an effective seal and high sensitivity by subjecting a resilient sealing element to the full and balanced effects of the pressure so that the element is rendered immobile by the pressure and obtains the desired operating motion between the parts not by substantial bodily movement of the seal element as such but by very limited movement as reflected by internal shear stress within the sealing element. The invention contemplates providing an assembly of a number of resilient elements such that the motion within one element is added to the motion in each of the other elements to provide as much control motion as may be desired.

For example, in one particular embodiment of my invention, it is desired to obtain a motion from the piston of about 0.003 of an inch which is sufficient to cover the full range of adjustment of a pilot control valve, micro-switch or the like and thus providing a full range of control. Such motion, however, must be obtained in response to relatively small changes in pressure at the pressure level of about 1,500 pounds per square inch, making it necessary to seal against the high pressures while obtaining free, accurate, sensitive movement from relatively small increments of change in pressure. These two requirements are resolved by arranging a plurality of individual sealing elements each one being of small size and being so confined as to be capable of sealing against the high pressures and obtaining a limited substantialy free movement from or in relation to each sealing element without any rolling or sliding movement of the elements. The elements are so disposed and so arranged that the internal movement within each sealing element is small and substantially free from "buildup" resistance and is added to that permitted by the others so that in the present illustration six sealing elements facilitate free movement in the aggregate 0.003 of an inch in a device of about 2 inches overall length. Thus the difficulty of obtaining a relatively large free and sensitive movement and at the same time sealing against high pressures is resolved. The design further contemplates that each sealing unit be balanced against pressures and that the unit be self aligning so that there will be no possibility of the device failing to respond accurately to small changes in pressure. Moreover the internal balancing feature of my seal preserves from harm while subjected to great changes in pressure.

It is among the objects of my invention to provide a piston type pressure unit capable of retaining fluid under high pressures and at the same time providing for sensitive movement of the piston adequate to operate conventional pressure and other type control systems. Another object is to provide a high pressure, pressure responsive unit in which movement of the piston is obtained by small changes in high internal shear within each of several sealing units and in which the total movement is obtained by adding the aggregate flexing of a plurality of but slightly flexed units. A general object is to provide a highly sensitive device capable of translating small changes in high fluid pressures into mechanical movements that accurately and sensitively reflect such changes while maintaining a fluid tight seal against loss of high pressure fluid. Another object is to provide a mechanism for the above mentioned purposes that will be rugged, durable and of high sensitivity and efficiency throughout a long life under widely different and adverse conditions of use. Another object is to provide such a device that will be substantially foolproof in operation and self-preserving against injury or destruction.

Other objects and advantages will be more apparent from the following description of my invention reference being had to the accompanying drawing in which:

Figure 1 is a longitudinal sectional view of a pressure responsive device embodying my invention; Figure 2 is a view corresponding to Figure 1 showing the parts under load in operating condition; Figure 3 is an enlarged sectional view showing a sealing O-ring and the adjacent parts under the conditions of Figure 2.

A preferred form of my invention is illustrated in Figures 1 and 2 and takes the form of a pressure responsive device indicated generally at 10, of piston and cylinder type, which is connected to a source of fluid under pressure and which is adapted to respond by movement of the piston 14 to changes in the pressure of the fluid. In the particular example described herein the device may be connected by a conduit 11 to a high pressure steam boiler or other source of high pressure, the changes in which are sought to be reflected in corresponding movements of the piston 14 and lever 12. Changes in such pressure result in corresponding movements of the piston to operate, for example, a pilot valve or other pneumatic, hydraulic, mechanical or electrical instrumentality, not shown, directly or through a lever 12 which is shown fragmentarily.

The pressure transmitting device preferably takes the form of a housing 13 having the piston-like member 14 movable therein. As viewed in Figure 1 the housing 13 comprises the cylindrical body portion 15 having a substantially cylindrical bore 16. A head 17 is threadedly secured to the body as at 18, a seal between the cap and body being provided by a suitable gasket. The cap has an opening 21 providing a port for the admission of high pressure actuating fluid through the conduit 11. The conduit has a fluid tight connection with the opening 21. The piston 14 has an enlarged head 22 which normally takes the position shown in Figure 1, defining between about the inner face 24 of the head and the housing the upper part of a high pressure chamber 25. A stem 26 extends downwardly from the head 22 and outwardly beyond the housing to make mechanical contact with the actuated lever 12 or other instrumentality. It will be apparent that movement of the piston within the housing will move lever 12 and thereby effect operation of the controlled apparatus. In the normal operation of my invention the lever 12 will exert a force on the piston substantially balancing the net effective fluid pressure exerted thereon and constraining the piston against substantially greater movement than intended for actuating the controlled mechanism.

As mentioned previously, a serious problem of sealing arises when the piston is moved in response to fluctuations in the high fluid pressures. Such a seal, however, is effectively provided by the present invention which comprises a series of axially aligned partially telescoping sleeve members 30 joined to each other, and at the ends of the series to the housing and to the pistons, by rubber-like O-rings 31. The arrangement is such that the series of sleeves 30 form a longitudinally extensible and contractible tube which is connected at its ends to the piston and housing respectively and which maintains at all times a seal between the piston 14 and the housing bore 16. In the preferred form of the invention the sleeves extend around the piston and are coaxial with the piston and cylinder. Each sleeve as best seen in Figure 3 takes the form of annulus having an external groove 35 and having an upwardly extending circumferential flange 36 which in turn has a shallow interior groove 37 as shown. When the sleeves are assembled they are in partially telescoping relation, with the flange 36 of one sleeve lying radially opposite the grooved part 35 of the immediately adjacent element, the grooves 35 and 37 defining an annular space 38 which is adapted to receive an O-ring 31.

The piston head 22 is provided with a groove 40 similar to the grooves 35 of the sleeves and positioned so that the flange 36 of the end sleeve will lie radially opposite and adjacent thereto. The seal between the cylindrical bore 16 and the other end sleeve is provided by an inwardly extending flange 41 of the housing cylinder which lies adjacent the groove 35 of the end sleeve and confines the O-ring therein.

The tolerances are such as to permit assembly of the parts with a minimum of play while limiting clearance of joints between the parts as at T to the order of a few thousandths of an inch so that there will be substantially no possibility of the high pressures extruding the O-rings through the joints. The diameters of the O-rings are preferably as small as is consistent with the function of the device so that the total forces on the O-rings are minimized. The dimensions of the parts are such that the O-rings fit rather snugly within the annular spaces 38 defined by the grooves of the parts so that the O-rings are substantially completely confined therein. In the example mentioned above the O-rings may be of about one-half inch mean diameter and about 0.1 inch cross-sectional diameter and preferably of about 70 durometer hardness. The projections 42 which in part define the interior grooves 37 of the flanges 36 are spaced away from the body portions of the adjacent sleeves so as to permit the O-rings to be inserted between the parts by a slight compression of the O-rings. Once an O-ring is inserted, the projections 42 tend to retain it within the space against inadvertent displacement. When the device is subject to the pressure of the fluid there is no tendency for the O-rings to become displaced. Rather, each O-ring tends to be flattened within the annular spaces 38 by the pressure so as to bear with sealing force against the juxtaposed and adjacent parts, see Figure 3. When the O-rings are subjected to the full pressure, they are lodged tightly in the annular spaces 38 and there is practically no tendency for them to slide or roll and movement between sleeves and between a sleeve and other adjacent parts takes place by flexing and tending to shear the O-rings.

As shown in the drawings each of the sleeves 30 so overlaps the adjacent sleeve and is so spaced therefrom that each of the annular spaces 38 is in free communication with and constitutes a part of the high pressure chamber 25. On the other hand atmospheric pressure is present in the space 27 along side the piston stem 26 and under the head of the piston as at 28 and between the radial inward parts of the sleeves as at 29 and under the corresponding part of the bottom ring. Therefore the net effective area of the sleeves in respect to the fluid pressures exerted upon them is zero with the result that if the piston is entirely restrained from bodily movement as by resistance of the lever 12 then the effect of the high pressure in the chamber 25 and in all the spaces 38 and the communicating spaces will not tend to move the sleeves relative to each other or relative to the housing. When the device is in operation the resistance of the lever 12 to piston movement is adjusted to travel the limited distances suggested above within the range of pressure changes sought to be reflected in the lever movement and by virtue of the multiplicity of the sleeves and rings the gross movement of the piston is reflected in relative movement of each sleeve with respect to the other and in flexure of the rings only that fraction of the total movement which equals the total movement divided by the number of rings. The sleeves are so shaped as apparent from the drawings that should the resistance of the lever 12 be insufficient to hold the piston in approximately the position shown in the drawings, then the overlapping shape of the sleeves is such that they would bottom upon each other, and the lower ring would bottom on the shoulder 32 of the housing whilst the head of the piston would bottom on the upper inner face 33 thereby positively limiting downward piston travel to a small safe amount determined by the longitudinal clearances between the sleeves and the shoulder 32 and the piston head. This latter feature tends to make the device foolproof and safe in the event high pressure should be admitted to the chamber 25 in the absence of normal resistance to piston movement as by the lever 12 or the equivalent part or "stop" of the controlled or actuated instrumentality.

The normal operation of the lever 12 or the controlled instrumentality will hold the piston in approximately the positions shown in Figures 1 and 2, yielding to the limited intended travel which is too small to be undertaken to be shown in the drawings. It may be taken for example that in a device of approximately the size shown in the drawings that the piston may have traveled downwardly several thousandths of an inch from the idle position shown in Figure 1 to the loaded position shown in Figures 2 and 3. In the form illustrated there being six O-rings, each of the rings would have been flexed but approximately ⅙ of the total travel and tended to be put slightly under shear stress by relative movement of the rings above and adjacent the space T. The rings, however, being in the much larger stress of compression as suggested in Figures 2 and 3, the very slight increment of flexure and/or shear developed in each ring is not a significant increment in resisting gross piston movement so that within the limits of piston movements that are sought and desired the piston movement is substantially free in respect to resistance from the rings and therefore piston movement is highly sensitive to changes in pressure in the chamber 25 and accurately reflects each increment of such change so that the same may be used with advantage in and by the controlled instrumentality. Inasmuch as the sleeves 30 and the complementary parts of the piston and housing are per se in a condition of hydrostatic balance with respect to each other, the tendency of any one sleeve to move more or less than any other in response to a change in fluid pressure in the chambers 25 and 38 is reflected in the tendency to flex or shear the corresponding O-ring more or less than the others which of itself tends to bring about an equal distribution of sleeve movements and an equal flexing or stressing of all of the O-rings. The results, among things, are that my device has the sensitivity of a large diameter piston or diaphragm combined however with the strength in resistance to pressure and leakage of a very small diameter diaphragm or piston, having the advantages of both without being encumbered by the disadvantages of either. My invention therefore does not merely comprise a multiplicity of seal rings but rather proceeds to distribute the load, work and flexure among the plurality of rings with such equality and with such little demand for flexing of each as to facilitate desirable gross movement with minimum gross resistance and maximum sensitivity.

While the parts are arranged so that the separate removable O-rings are confined and held in annular spaces 38 between the parts, it is within my invention to provide resilient sealing elements bonded directly to the sleeves in the spaces 38 to do the work of the O-rings. In such a case the bonded rubber rings should be partially supported so as to be able to withstand the pressure of the fluid and should be of sufficient thickness to permit a moderate amount of internal shearing movement without damage to the seal and without substantial resistance to much movement. The possibility of using a bonded rubber metal type of seal is mentioned to illustrate the kind of work that the yielding sealing element is called upon to do and facility by which it is done in my invention.

While I have mentioned specific dimensions of the general size and parts of my invention in its preferred form and have stated particular values of "high" pressures with which that preferred form of my invention has operated quite successfully, and while I have mentioned the utility of my invention in its action with and upon a pneumatic pilot valve especially, all these things have been stated by way of illustrating a best form and certain advantages of my invention and not by way of limitation. For example, the particular pressures mentioned are those presently in use and presently posing the immediate problem for which my invention is a solution, but I am aware of no reason why my invention and its principles may not have wide utility with much higher and/or different pressures and in association with different actuated instrumentalities in widely different uses and conditions of use.

Further modifications and changes will suggest themselves to those skilled in the art without departing from the spirit and scope of my invention and I do not desire to be limited in the scope of my patent to the preferred form of my invention herein specifically described nor in any manner incommensurate with the advance my invention marks over the prior art.

I claim:

1. A pressure device of the type described comprising a housing having a chamber connected to a source of fluid under pressure, a piston movable within said chamber in response to changes in fluid pressure, a seal between said housing and piston comprising a plurality of sleeves, resilient O-rings disposed between said sleeves and between one of said sleeves and the housing and another of said sleeves and the piston, the O-rings being partially confined to restrict the bodily movement thereof, movement of said piston with respect to said housing stressing said O-rings essentially in shear.

2. A pressure device according to claim 1 wherein said sleeves are coaxially aligned in series and are partially telescoping.

3. A pressure device according to claim 2 wherein each of said sleeves has an external groove and has a flange extending from said groove adjacent the groove of the next adjacent sleeve when said sleeves are partially telescoped, the flange of one sleeve and the groove of the adjacent sleeve defining an annular space to receive said O-ring; the piston being grooved and the housing flanged to define with the flange and groove respectively of the end sleeves of said series annular spaces for said O-rings respectively.

4. A pressure device according to claim 3 wherein said flanges have inwardly projecting shoulders at the ends thereof to retain said O-rings in said annular spaces.

5. A pressure device according to claim 3 wherein said flanges are grooved to retain said O-rings in conjunction with said first named grooves.

6. A pressure device adapted to translate changes in fluid pressure into mechanical motion comprising a housing member enclosing a cylindrical chamber connected to a source of fluid pressure, a piston movable within said chamber in response to changes in said pressure, said piston comprising a stem portion extending beyond said chamber and a head portion exposed to said fluid pressure, means providing a seal between said piston and said housing while permitting limited movement of said piston, comprising a plurality of coaxial metallic sleeves disposed about said piston, each of said sleeves having an outwardly facing groove forming a C-shaped section and having a flange extending upwardly from said section, said flanges being adapted to lie adjacent the groove of adjacent sleeves when the sleeves are partially telescoped, said flanges having shoulders and grooves defining annular spaces with the adjacent groove of said C-shaped section, resilient elements disposed within said annular spaces and retained therein by said shoulders, the head of said piston being externally grooved and defining a similar annular space with the flange of the adjacent sleeve, the housing having an inwardly extending flange defining a similar annular space with the groove of the sleeve adjacent thereto.

7. A seal permitting relative limited movement between a fixed member and a movable member comprising a plurality of annular sleeves coaxial with each other and partially telescoping with each other, said members and said sleeves having transversely extending shoulders, and a resilient packing interposed between each of said sleeves and between a sleeve and said fixed member and between another sleeve and said movable member, said packing being supported by and partially confined by said shoulders and restrained by said shoulders against bodily movement, movement between pairs of adjacent sleeves and between each of said members and the sleeves adjacent thereto being limited to the shear displacement of said packing material whereby movement of said movable member relative to said fixed member is the sum of the shear displacements in said packings.

8. A pressure transmitting device adapted to translate changes of pressure into mechanical motion comprising a fixed member and a member movable within said fixed member, said fixed member having a chamber connected to a source of variable fluid pressure and said second member movable in response to changes in said pressure, and a seal between said members effective to retain said fluid while permitting limited movement of said movable member, said seal comprising a plurality of coaxial sleeves positioned around said movable member and arranged in partially telescoping relation with each other, said sleeves each having a C-shaped section having an external groove, said sleeves also having a flange extending from said section and adapted, when the members are partially telescoped, to extend adjacent the groove of the next adjacent sleeve to define a partially enclosed space, an O-ring disposed in each of said spaces, said movable member having a groove corresponding to said above mentioned groove, an O-ring disposed in said latter groove and partially confined therein by the flange of an adjacent sleeve, said fixed member having an inwardly extending flange having an annular internal surface disposed adjacent the groove of one of said sleeves and an O-ring partially confined in the space defined by said internal surface and said groove.

9. A pressure device of the type described comprising a cylindrical housing member enclosing a chamber connected to a source of fluid pressure, a piston member movable within said chamber in response to changes in said pressure, means providing a seal between said housing and said piston while permitting a limited movement of said piston comprising a plurality of annular grooved partially telescoping members extending around said piston, an O-ring positioned between the telescoping portions of each adjacent pair of annular members, and an O-ring positioned between the housing and one of said annular members and between the piston and another of said members.

10. A pressure device of the type described comprising a cylindrical housing, a piston capable of limited movement within said housing, means providing a seal between said piston and said housing comprising a plurality of telescoping members, resilient sealing means disposed between said members and between one of said members and said piston and between another of said members and housing.

11. A fluid pressure seal for a fluid motor characterized by a plurality of resilient annular longitudinally aligned and spaced packing members and stepped telescoping sleeve elements between pairs of which said packing elements are confined, each pair of said sleeve elements providing closely spaced relatively movable portions supporting a packing member against fluid pressure and each sleeve element having equal and appropriate effective areas exposed to fluid pressure tending to move it longitudinally.

ROGER L. GILLILAND.

REFERENCES CITED

The following references are of record in the file of this patent:

UNITED STATES PATENTS

| Number | Name | Date |
|---|---|---|
| 2,180,795 | Christensen | Nov. 21, 1939 |
| 2,314,683 | Berry | Mar. 23, 1943 |
| 2,476,021 | Bender | July 12, 1949 |